No. 672,847. Patented Apr. 23, 1901.
F. H. BREWSTER.
AUTOMATIC STOP FOR HEAVY MACHINERY.
(Application filed Feb. 4, 1901.)
(No Model.) 2 Sheets—Sheet 1.
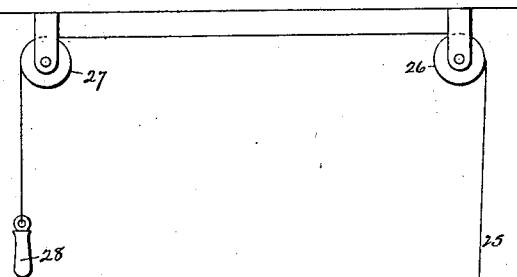
Fig. 1.
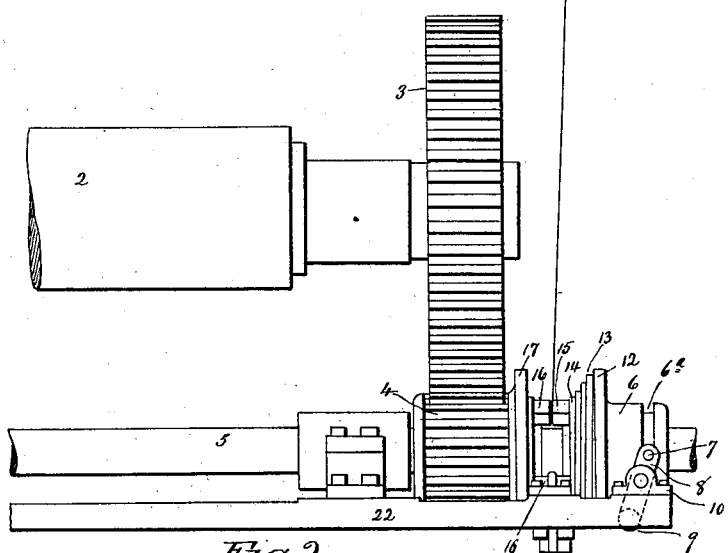
Fig. 2.
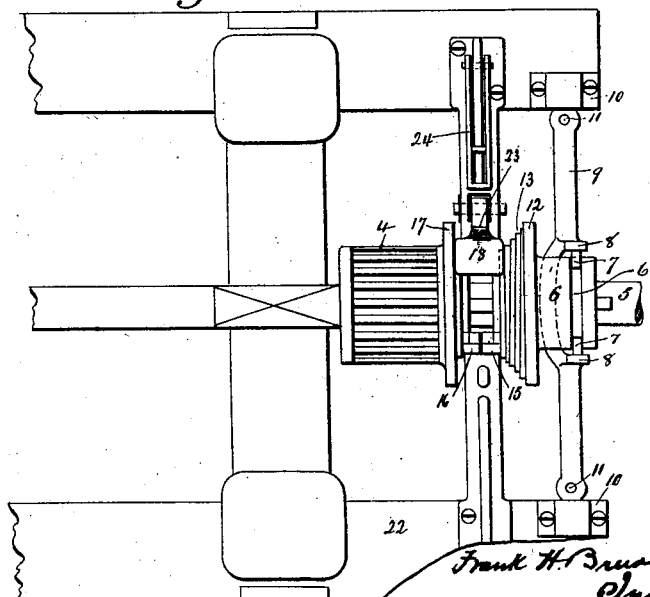

No. 672,847. Patented Apr. 23, 1901.
F. H. BREWSTER.
AUTOMATIC STOP FOR HEAVY MACHINERY.
(Application filed Feb. 4, 1901.)
(No Model.) 2 Sheets—Sheet 2.
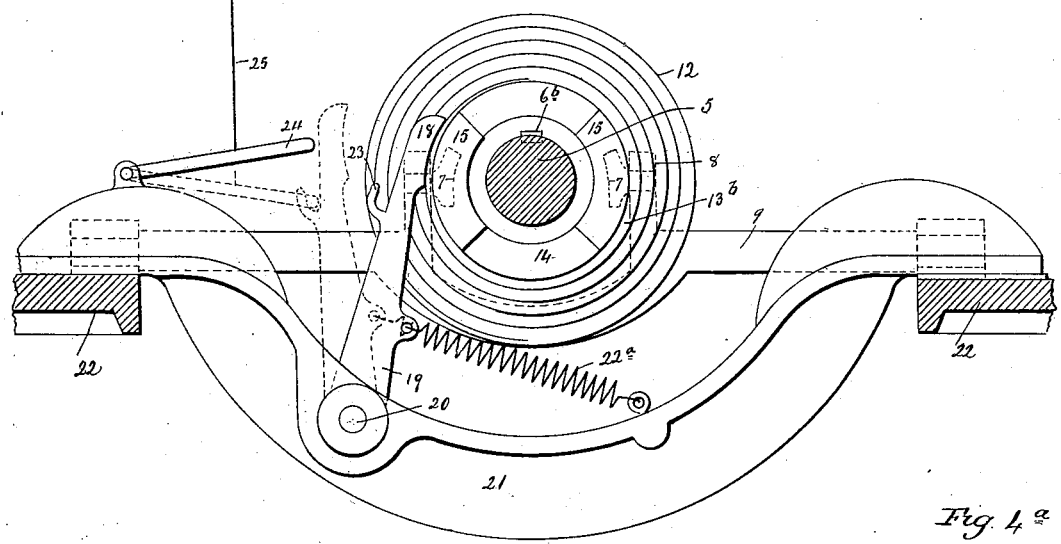
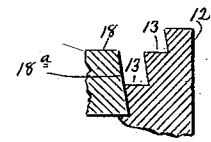
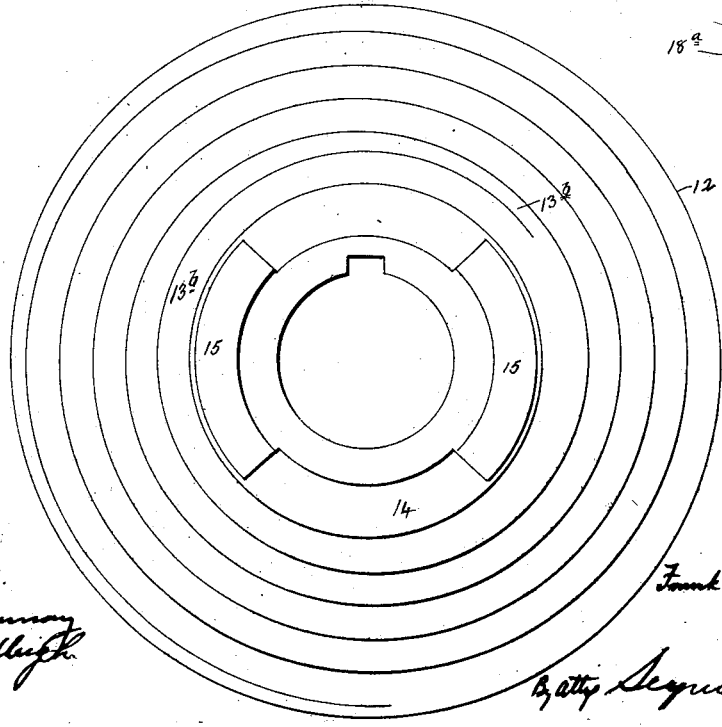

UNITED STATES PATENT OFFICE.

FRANK H. BREWSTER, OF DERBY, CONNECTICUT, ASSIGNOR TO THE BIRMINGHAM IRON FOUNDRY, OF SAME PLACE.

AUTOMATIC STOP FOR HEAVY MACHINERY.

SPECIFICATION forming part of Letters Patent No. 672,847, dated April 23, 1901.

Application filed February 4, 1901. Serial No. 45,352. (No model.)

*To all whom it may concern:*

Be it known that I, FRANK H. BREWSTER, of Derby, in the county of New Haven and State of Connecticut, have invented a new Improvement in Automatic Stops for Heavy Machinery; and I do hereby declare the following, when taken in connection with the accompanying drawings, and the characters of reference marked thereon, to be a full, clear, and exact description of the same, and which said drawings constitute part of this specification, and represent, in—

Figure 1, a view in elevation showing the application of my improvement to a rolling-mill; Fig. 2, a plan view of the same; Fig. 3, a view in vertical section looking at the spiral cut-off cam upon the sliding member of the clutch; Fig. 4, an enlarged detached view, in inside elevation, of the sliding member of the clutch, showing its spiral cut-off cam; Fig. $4^a$, a broken view in vertical section showing the undercutting of the faces of the spiral cut-out cam and the corresponding bevel of the coacting edge of the cut-out head.

My invention relates to an improvement in that class of stops for promptly stopping heavy machinery, such as the rolls of rolling-mills, the object being to provide a simple, convenient, prompt, and effective stop constructed with particular reference to so reducing the shock of stopping the machine that the same will neither be broken, strained, deranged, nor otherwise damaged.

With these ends in view my invention consists in an automatic stop having certain details of construction and combinations of parts, as will be hereinafter described, and pointed out in the claims.

For the purpose of illustration I have shown my improved automatic stop as applied to a rolling-mill. It may, however, be used on other machinery to equal advantage. This mill, which is only partially shown, has a heavy roll 2, rotated by a large gear-wheel 3, driven by a pinion 4, loosely mounted upon the main shaft 5, but coupled therewith for rotation thereby by means of a clutch comprising a sliding member 6, formed with a groove $6^a$, receiving pins 7 7, mounted in the upper portion of the yoke 8 of a rocking shipper 9, the ends of which are journaled in boxes 10 and formed with sockets 11 for the reception of a tool or bar, by means of which the yoke is rocked inward for starting the machine or outward for stopping it. The sliding member 6 of the clutch is connected to the shaft 5 by means of a spline $6^b$, whereby it is always rotated with the shaft, but is free to have sliding movement within narrow limits upon the same. The said sliding member 6 of the clutch is formed at its inner end with a large circular flange 12, provided upon its inner surface with a spiral cut-out cam 13, containing several coils the faces of which, instead of being located in the plane of the flange 12, are undercut, as clearly shown in Fig. $4^a$. The inner coil of the said cut-out cam 13 terminates in a flat annular shoulder 14, beyond which project two heavy clutch-teeth 15 15, which coact with two clutch-teeth 16 16, projecting outward from a flange 17, corresponding in diameter to the flange 12 and located at the outer end of the pinion 4, already mentioned. The said flange 17 is, in effect, the rotary member of the clutch and is complementary to the sliding member 6 thereof. It will be observed by reference in particular to Figs. 1 and 2 of the drawings that a considerable space is formed between the flange 12 of the sliding member 6 of the clutch and the flange 17 of the pinion 4.

For coaction with the spiral cut-out cam 13 I employ a cut-out head 18, which tapers slightly from its inner to its outer end, though this wedge form is not very marked. The outer edge of this head is formed with a bevel $18^a$, adapting the said edge to enter the undercut portions of the faces of the coils of the cut-out cam 13, as shown in Fig. $4^a$, whereby the head when once brought into operation is prevented from being thrown outward by the rapid rotation of the parts with which it coacts. This head 18 is formed upon an arm 19, pivoted upon horizontal stud 20, so as to swing back and forth in a vertical plane. The said stud 20 is mounted in a bowed frame-piece 21, extending under the clutch mechanism and bolted at its ends to the machine-frame 22, to which the boxes 10, before mentioned, are also secured. The spiral spring $22^a$, attached at one end to the frame 21, is fastened at its opposite end to the pivotal arm 19 and exerts a constant effort to pull the arm inward, so as to enter its wedge-shaped cut-off head 18 into the space between the flanges 12 and 17, before mentioned. The primary function of this spring is to enter the head between the flanges 12 and 17 rather than to hold it in operating position after having been so entered, when the coacting undercut faces of the coils of the cut-out cam and the beveled outer edge of the head will relieve the spring of the duty of overcoming the tendency of the revolving parts to throw the head out of place. Normally the arm is held in its retired and inoperative position by means of a hook 23, formed upon the arm in position to be engaged by a cut-out loop 24, pivoted at its outer end upon the outer end of the frame 21 and having connected with it an operating cord or cable 25, extending upward and running over pulleys 26 and 27 and having its opposite end furnished with a handle 28, which is designed to hang down in front of the machine in a position where it may be conveniently grasped and pulled by the operator thereof.

When it is desired to stop the machine, the handle 28 is caught and pulled or twitched, whereby the cut-out loop 24 is lifted out of engagement with the finger 23, allowing the spring 22 to act to pull the arm 19 inward, and thus enter its cut-out head 18 between the flanges 12 and 17, both of which are at this time rapidly rotating. The outer edge of the head will almost immediately be engaged by the extreme outer end 13$^a$ of the spiral cut-out cam, which will then coact with the said edge to positively but gradually force the sliding member 6 of the clutch outward until the clutch-fingers 15 and 16 have been disengaged. At or about this time the head 18 will have ridden off from the inner end 13$^b$ of the spiral cut-out cam onto the flat annular shoulder 14, which holds it out of engagement with the clutch-fingers 15 15. Although the spiral cut-out cam 13 may contain several coils, the rotation of the main shaft 5 is so rapid that the stopping of the machine will be prompt enough for all practical purposes, while, on the other hand, the power for stopping the machine is applied so comparatively gradually that the shock of suddenly arresting the motion of a mass of heavy machinery driven at a high speed is so distributed that the machine will not be broken, strained, deranged, or otherwise damaged, which very frequently results with the employment of the abrupt stop-cams now used in automatic stops for heavy machinery, such as rolling-mills.
It is apparent that in carrying out my invention some changes may be made in the mechanism shown and described. I would therefore have it understood that I do not limit myself to the same, but hold myself at liberty to make such alterations as fairly fall within the spirit and scope of my invention.

Having fully described my invention, what I claim as new, and desire to secure by Letters Patent, is—

1. In an automatic stop for heavy machines, such as rolling-mills, the combination with a clutch having a rotary member, a sliding member and a spiral cut-out cam located upon one of the said members; of a cut-out head adapted to be temporarily interposed between the said members and to coact with the said cam.

2. In an automatic stop for heavy machines, such as rolling-mills, the combination with a clutch having a rotary member, a sliding member and a spiral cut-out cam located upon one of the said members, and undercut, of a cut-out head temporarily interposed between the said members for coacting with the said cam, the undercut of which prevents the head from being thrown outward away from it.

3. In an automatic stop for heavy machines, such as rolling-mills, the combination with a clutch having rotary and sliding members, of a spiral cut-out cam located upon and encircling the inner face of the said sliding member, of a cut-out head adapted to be temporarily interposed between the two members, at which time the cut-out cam coacts with the head to slide the said member and break the engagement between the two members of the clutch, and so stop the machine.

4. In an automatic stop for heavy machines, the combination with a clutch having a rotary member, a sliding member and a spiral cut-out cam located upon one of the said members and terminating at its inner end in a flat annular shoulder; of a cut-out head adapted to be temporarily interposed between the two members of the clutch and to coact with the said cam for moving the sliding member away from the other member so as to break the engagement between them and stop the machine.

5. In an automatic stop for heavy machines such as rolling-mills, &c., the combination with a clutch having a rotary and a sliding member, the inner face of one of which is encircled by a spiral cut-out cam, of a pivotal arm adapted to swing in a vertical plane, and provided upon its outer end with a cut-out head adapted to enter between the said members and coact with the said spiral cut-out cam, a spring for exerting a constant effort to draw the said arm into action, a cut-out hook engaging with the said arm for keeping the head in a position of normal retirement, and means connected with the said hook for lifting the same and releasing the arm.

In testimony whereof I have signed this specification in the presence of two subscribing witnesses.

FRANK H. BREWSTER.

Witnesses:
J. H. SHUMWAY,
FRED. C. EARLE.